UNITED STATES PATENT OFFICE.

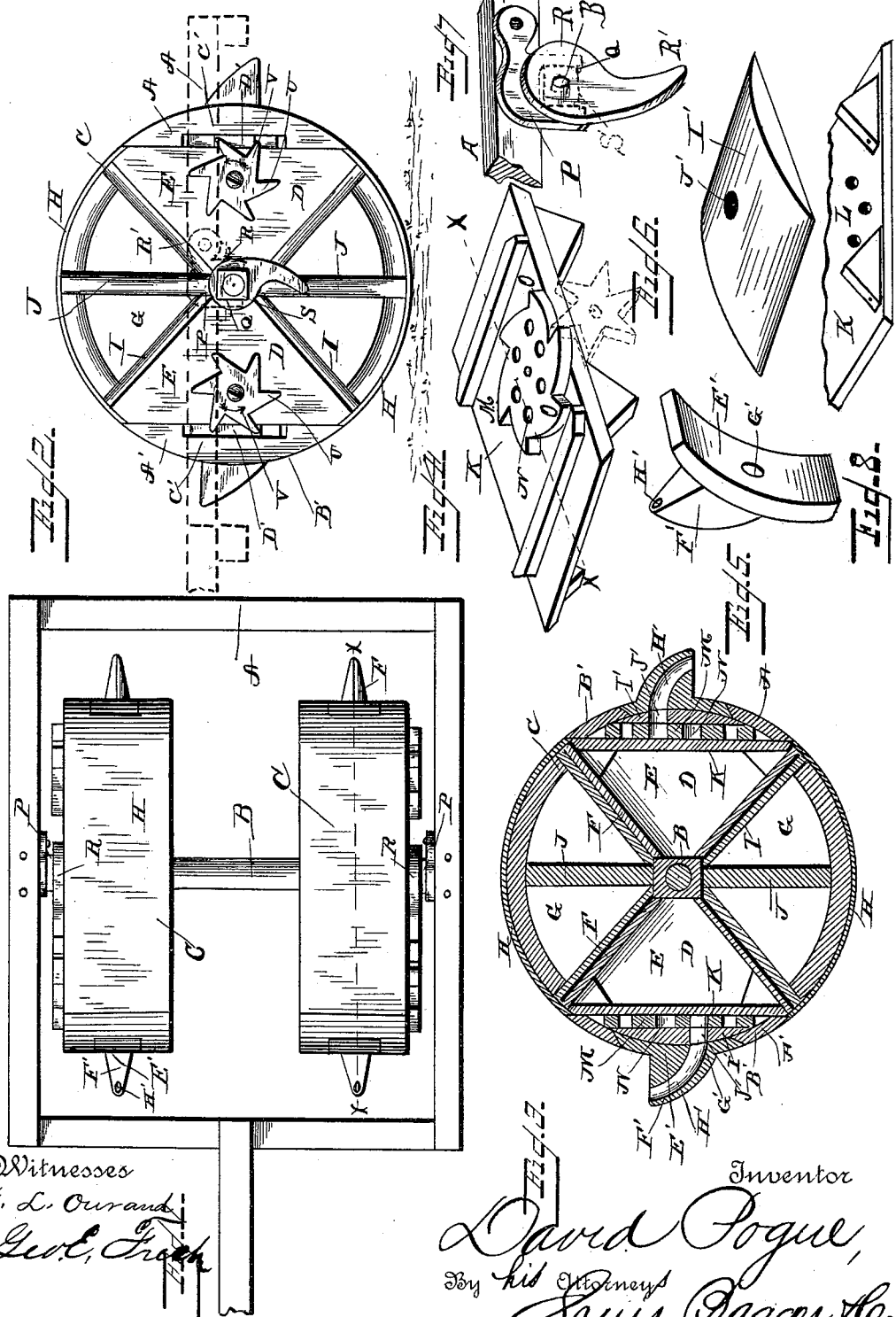

DAVID POGUE, OF SARATOGA, INDIANA.

CORN-PLANTER.

SPECIFICATION forming part of Letters Patent No. 372,564, dated November 1, 1887.

Application filed August 11, 1887. Serial No. 246,666. (No model.)

*To all whom it may concern:*

Be it known that I, DAVID POGUE, a citizen of the United States, and a resident of Saratoga, in the county of Randolph and State of Indiana, have invented certain new and useful Improvements in Corn-Planters; and I do hereby declare that the following is a full, clear, and exact description of the invention, which will enable others skilled in the art to which it appertains to make and use the same, reference being had to the accompanying drawings, which form a part of this specification, and in which—

Figure 1 is a top plan view of my new and improved corn-planter. Fig. 2 is a side view of the same. Fig. 3 is a central longitudinal sectional view of one of the feed-wheels of the planter, as indicated by lines $x$ $x$ of Figs. 1 and 4. Fig. 4 is a detail view of the feed-disk and the feed-plate, to the under side of which it is attached, a portion of the operating mechanism being shown in dotted lines. Figs. 5 and 6 are detail views, the nature of which will be hereinafter described. Fig. 7 is a perspective view of the clutch-plate and ratchet, and Fig. 8 is a perspective view of a portion of the feed-plate.

The same letters of reference indicate corresponding parts in all the figures.

My invention relates to corn-planters; and it consists, more especially, in the new and improved construction, arrangement, and combination of parts of the seed-wheels of a corn-planter, as will be hereinafter fully described and claimed.

Referring to the several parts by letter, A indicates the rectangular frame of my new and improved corn-planter, which has the axle B, on the ends of which are mounted the supporting and seed wheels C C, as shown. Each of these seed-wheels is rigidly mounted on the axle so as to turn therewith as the machine is drawn forward, and is formed with the two diametrically-opposite seed hoppers or receptacles D D, formed of the parallel side plates, E E, and the radial end plates, F F, arranged as clearly shown in the sectional view, Fig. 3 of the drawings, and between these hoppers or seed-receptacles are preferably left the open spaces G G, which increase the lightness and simplicity of construction of the wheels, these open spaces being closed by the peripheral curved plates H H, which complete the periphery of the wheel, and which are braced by the curved and radial braces I and J, respectively.

The outer edges of the side plates of each hopper or seed-receptacle D D are formed as shown, being cut off straight, and the square mouth of the hopper or receptacle D thus formed is closed by the flat feed-plate K, which is formed with three or more transverse apertures, L, arranged in the arc of a circle near one edge of the said plate. The number of these openings L may be varied according to the number of grains of corn which it is desired to plant in each hill, and the said openings are of such size as to enable a grain of corn to pass readily through each. To one side of this feed-plate is centrally journaled the feed disk or wheel M, which is formed with the series of openings N, of the same size as the openings L in the feed-plate K, and which are arranged in a circle in the feed-wheel, the said wheel being journaled to one side of the feed-plate K at such a point that as it is revolved, as hereinafter described, its openings N will register with the openings L of the feed-plate. This feed-wheel is formed outside of the circle of openings N with the slightly-inclined teeth O, as shown.

Upon each side of the frame A, to the outer side of the main wheels C C, is pivoted at its upper end, as shown, a clutch-plate, P, having the square recess Q formed in its lower end, and upon the axle B, to the same side of each of the wheels C C, is loosely mounted a ratchet, R, having the square projection S on its outer side, with which the lower recessed end of the clutch-plate engages; and it will be seen that when the planter is being drawn along the field and the clutch-plates are turned down, so that their recessed lower ends engage with the squared sides of the ratchets R R, and while the axle on which the said ratchets are loosely mounted is being revolved by the wheels C C, the said ratchets will be held stationary, with their reduced projecting ends R' R' extending down by the outer sides of the wheels C C, so as to engage with the long slightly-inclined teeth U of ratchet-wheels V V, which are journaled one on the outer side of the lower part of each hopper or seed-receptacle D D of the two wheels C C, as shown.

The outer end of each hopper or seed-receptacle is inclosed by a cap-piece, A', the outer main side, B', of which is curved to correspond with and form a part of the periphery of the wheel C, as shown, while the sides C' C' of the said cap are straight and parallel, to form continuations of the flat sides of the hopper, one of the said sides being cut away or recessed longitudinally at its inner edge to form an opening, D', through which the outer halves of the teeth O of the feed-wheel M project when the cap is secured in position on the end of the seed-hopper, so that the said teeth may mesh with the teeth of the ratchet-wheels V V, as shown.

In the center of each cap A' is secured a shoe, E', having the projecting bill or blade F', which is formed, as shown, with the curved and beveled front edge to open the ground for the reception of the corn, the rear edge of this spur or blade being straight, and this shoe is formed with a central transverse opening, G', and the spur or blade is likewise formed with a curved opening, H', which forms a continuation of the opening G', extending down through the spur or blade to the point of the same, having its exit at the lower or outer end of the straight rear side of the spur, as clearly shown in the sectional view, Fig. 3, of the drawings. A plate, I', which may be distinguished by calling it the "discharge-plate," is secured over this shoe inside of the cap A', and is formed with a single opening, J', through which the seed or corn passes from the feed-wheel M on its way to the spur or opening-blade F'.

The operation of my new and improved corn-planter is as follows: The corn having been placed in the hoppers or receptacles D in the wheels C, and the plates and cap replaced and secured over the mouths of the said receptacles to complete the periphery of the wheels, the clutch-plates P are turned down, so that their squarely-recessed lower ends engage with the squared sides of the ratchets R, when the planter is ready for use. The object in pivoting the clutch-plates at their upper ends is that when the planter is being drawn from one field to another or along the road the dropping or planting mechanism can be stopped or prevented from working by merely turning up the clutch-plates P, so that their lower ends will not engage with the square sides of the ratchets, when the corn will not be fed out of the seed-receptacles. As the planter, adjusted for use as above described, is drawn forward, the wheels C C will revolve, and with them the axle, and it will be seen that as each hopper approaches the ground one of the teeth of the ratchet-wheel V on its side will come in contact with the downwardly-projecting end or point of the ratchet R, the ratchets being held stationary as the shaft or axle on which they are loosely mounted revolves by the clutch-plates P P, as before described; and as the wheels C continue to revolve as the teeth of the ratchet-wheels come in contact with the stationary ratchets, the said wheels V will be turned on their central pivots for one space or tooth in the direction indicated, and as each ratchet wheel is thus turned one of its teeth will engage with one of the teeth of the feed-wheel M of its hopper, thus turning the said feed-wheels for one space, so that three of their perforations or openings N will pass under and register with the three openings L of the feed-plates K and pass beyond the said openings, so that by this movement they will allow the three grains of corn held in the openings of the feed-plate K to pass through their openings N, and continuing on will again close the said openings of the feed-plate until the feed-wheels are again moved. The grains of corn which thus pass through the openings of the feed-wheels pass through the opening J' of the discharge-plate I' and through the openings G' and H' out through the end or point of the spur or blade F' at the flat or straight outer end of the side or edge of the same, as will be readily understood. As each hopper thus reaches its lowermost position, the corn is thus fed out through the spur into the opening made by the beveled curved edge of the same.

From the foregoing description, taken in connection with the accompanying drawings, the construction, operation, and advantages of my invention will be readily understood. It will be seen that my invention is comparatively simple and strong in construction and exceedingly efficient and effective in its operation. Many minor changes may be made in the construction of my planter without departing from the spirit of my invention.

Having thus described my invention, what I claim, and desire to secure by Letters Patent of the United States, is—

1. In a corn-planter, the combination, with the axle thereof, of the wheel formed with the seed-receptacles and having the ratchet-wheels pivoted on the sides of the same, the feed-plates formed with the openings, the pivoted feed-wheels formed with the series of openings and the inclined teeth, the cap-piece formed with the side opening and having the shoe formed with the central opening, the spur or blade formed with the beveled curved forward edge and straight rear edge and the inclined opening, and the stationary ratchets, substantially as set forth.

2. In a corn-planter, the combination, with the axle thereof, of the wheel formed with the seed-receptacles and having the ratchet-wheels pivoted on the sides of the same, the feed-plates formed with the openings, the pivoted feed-wheel formed with the series of openings and the inclined teeth, the cap-pieces formed with the side opening and having the shoe formed with the central opening, the spur or blade formed with the beveled curved forward edge and straight rear edge and the inclined opening, the discharge-plate having the transverse opening, and the stationary ratchets, substantially as set forth.

3. In a corn-planter, the combination, with the axle thereof, of the wheel formed with the seed-receptacles and having the ratchet-wheels pivoted on the sides of the same, the feed-plates formed with the openings, the pivoted feed-wheels formed with the series of openings and the inclined teeth, the cap-pieces formed with the side opening and having the shoe formed with the central opening, the spur or blade formed with the beveled curved forward edge and straight rear edge and the inclined opening, the discharge-plate having the transverse opening, the ratchets loosely mounted on the axle, and the clutch-plates pivoted or hinged at their upper ends, substantially as and for the purpose herein set forth.

In testimony that I claim the foregoing as my own I have hereunto affixed my signature in presence of two witnesses.

DAVID POGUE.

Witnesses:
IRA DAVIS,
DELASKA E. BARBER.